(12) United States Patent
Yu et al.

(10) Patent No.: US 10,219,143 B2
(45) Date of Patent: *Feb. 26, 2019

(54) DATA TRANSMISSION METHOD, MOBILITY MANAGEMENT ENTITY, AND MOBILE TERMINAL

(71) Applicant: Huawei Technologies Co., Ltd., Shenzhen, Guangdong (CN)

(72) Inventors: Qi Yu, Beijing (CN); Xiaolong Guo, Beijing (CN); Wanqiang Zhang, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,523

(22) Filed: Jun. 6, 2016

(65) Prior Publication Data

US 2016/0286376 A1    Sep. 29, 2016

Related U.S. Application Data

(63) Continuation of application No. 14/268,158, filed on May 2, 2014, now Pat. No. 9,363,658, which is a
(Continued)

(30) Foreign Application Priority Data

Nov. 4, 2011    (CN) .......................... 2011 1 0347639

(51) Int. Cl.
*H04W 8/02* (2009.01)
*H04W 8/24* (2009.01)
(Continued)

(52) U.S. Cl.
CPC .......... *H04W 8/02* (2013.01); *H04L 61/2007* (2013.01); *H04L 69/324* (2013.01); *H04W 8/24* (2013.01); *H04W 72/0493* (2013.01)

(58) Field of Classification Search
CPC ................................. H04W 8/02; H04W 8/24
See application file for complete search history.

(56) References Cited

U.S. PATENT DOCUMENTS

| 2005/0190909 | A1  | 9/2005 | Yoneyama et al. |
| 2009/0219951 | A1* | 9/2009 | Chun .................... H04W 8/26 370/474 |
| 2013/0080597 | A1* | 3/2013 | Liao .................... H04L 5/0001 709/219 |

(Continued)

FOREIGN PATENT DOCUMENTS

WO    WO 2011/119680 A2    9/2011

OTHER PUBLICATIONS

"MTC trigger considerations", Huawei, Hisilicon, SA WG2 Meeting #87, Oct. 10-14, 2011, 4 pages.
(Continued)

*Primary Examiner* — Chuong A Ngo

(57) ABSTRACT

Embodiments of the present invention disclose a data transmission method, a mobility management entity, and a mobile terminal. The method includes: receiving, by a mobility management entity, a small data transmission parameter that is sent by a home subscriber server HSS or a user equipment, where the small data transmission parameter includes an indication of whether the user equipment supports small data transmission; determining, by the mobility management entity, a small data transmission policy according to the small data transmission parameter; sending, by the mobility management entity, the determined small data transmission policy to the user equipment; and performing, by the mobility management entity, the small data transmission with the user equipment according to the small data transmission policy. The present invention proposes a relatively complete small data transmission solution, thereby implementing effective transmission of small data.

21 Claims, 10 Drawing Sheets

Related U.S. Application Data continuation of application No. PCT/CN2012/084016, filed on Nov. 2, 2012.

(51) Int. Cl.
| | | |
|---|---|---|
| *H04L 29/12* | (2006.01) | |
| *H04L 29/08* | (2006.01) | |
| *H04W 72/04* | (2009.01) | |

(56) References Cited

U.S. PATENT DOCUMENTS

2014/0328246 A1* 11/2014 Xu ................ H04W 36/08
370/315

OTHER PUBLICATIONS

"MTC small data identification mechanism for non-SMS Small Data Transmission Solution", MediaTek Inc., SA WG2 Meeting #87, Oct. 10-14, 2011, 8 pages.

"3rd Generation Partnership Project; Technical Specification Group Services and System Aspects; System Improvements for Machine-Type Communications; (Release 11)", 3GPP TR 23.888 v1.5.0, Oct. 2011, 155 pages.

"TS 23.139: Procedure for HNB CS service in roaming case", Huawei, Hisilicon, 3GPP TSG SA WG2 Meeting #86, Jul. 11-15, 2011, 4 pages.

"Efficient small data transmission", Vodafone, IPWireless, SA WG2 Meeting #86, Jul. 11-15, 2011, 4 pages, S2-113826.

"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.5.0, Sep. 2011, 282 pages.

Hitachi; "Online Small Data Transfer using NAS"; SA WG2 Temporary Document; SA WG2 Meeting #86; S2-113043; Naantali, Finland; Jul. 11-15, 2011; 5 pages.

Nokia; "MTC Feature Negotiation"; SA WG2 Temporary Document; 3GPP TSG SA WG2 Meeting #83; TD S2-110780; Salt Lake City, Utah, USA; Feb. 21-25, 2011; 7 pages.

\* cited by examiner

DATA TRANSMISSION METHOD, MOBILITY MANAGEMENT ENTITY, AND MOBILE TERMINAL

CROSS-REFERENCE TO RELATED APPLICATIONS

This application is a continuation of U.S. patent application Ser. No. 14/268,158, filed on May 2, 2014, which is a continuation of International Application No. PCT/CN2012/084016, filed on Nov. 2, 2012, which claims priority to Chinese Patent Application No. 201110347639.3, filed on Nov. 4, 2011. The afore-mentioned patent applications are hereby incorporated by reference in their entireties.

TECHNICAL FIELD

The present invention relates to the field of wireless communications, and in particular, to a data transmission method, a mobility management entity, and a mobile terminal.

BACKGROUND

In the architecture of a system architecture evolution (SAE) communications system, a terminal accesses a mobility management entity (MME) and a serving gateway (S-GW) of a core network through an evolved NodeB (eNodeB or eNB), and is connected to a packet data network gateway (P-GW) through the S-GW.

Small data transmission is a special type of data transmission in a wireless communications network system. User plane bearers (including a core network side and an air interface side) need to be established by using signaling to perform data transmission; however, small data (usually less than 1 Kbyte) may be transmitted infrequently, for example, only transmitted once or twice; and in this case, a user plane is established for the small data transmission by using signaling to transmit the data, and after the transmission is completed, an air interface bearer needs to be deleted, which wastes a signaling resource.

SUMMARY

An objective of the present invention is to provide a data transmission method and a mobility management entity, so as to prevent a waste of a signaling resource.

According to one aspect, an embodiment of the present invention provides a data transmission method, including:

receiving, by a mobility management entity, a small data transmission parameter that is sent by a home subscriber server HSS or a user equipment, where the small data transmission parameter includes an indication of whether the user equipment supports small data transmission;

determining, by the mobility management entity, a small data transmission policy according to the small data transmission parameter;

sending, by the mobility management entity, the determined small data transmission policy to the user equipment; and performing, by the mobility management entity, the small data transmission with the user equipment according to the small data transmission policy.

According to another aspect, an embodiment of the present invention further provides a data transmission method, including:

sending, by a user equipment, a small data transmission parameter to a mobility management entity, where the small data transmission parameter includes an indication of whether the user equipment supports small data transmission, so that the mobility management entity determines a small data transmission policy according to the small data transmission parameter;

receiving, by the user equipment, the small data transmission policy that is sent by the mobility management entity; and performing, by the user equipment, the small data transmission with the mobility management entity according to the small data transmission policy.

According to one aspect, an embodiment of the present invention further provides a mobility management entity, including:

a receiving unit, configured to receive a small data transmission parameter that is sent by a home subscriber server HSS or a user equipment, where the small data transmission parameter includes an indication of whether the user equipment supports small data transmission;

a determining unit, configured to determine a small data transmission policy according to the small data transmission parameter that is received by the receiving unit;

a sending unit, configured to send the small data transmission policy that is determined by the determining unit to the user equipment; and a transmitting unit, configured to perform the small data transmission with the user equipment according to the small data transmission policy that is determined by the determining unit.

According to one aspect, an embodiment of the present invention further provides a mobile terminal, including:

a parameter sending unit, configured to send a small data transmission parameter to a mobility management entity, where the small data transmission parameter includes an indication of whether the mobile terminal supports small data transmission, so that the mobility management entity determines a small data transmission policy according to the small data transmission parameter;

a policy receiving unit, configured to receive the small data transmission policy that is sent by the mobility management entity; and a data transmitting unit, configured to perform the small data transmission with the mobility management entity according to the small data transmission policy that is received by the policy receiving unit.

According to the present invention, a mobility management entity receives a small data transmission parameter that is sent by a home subscriber server HSS or a user equipment, where the small data transmission parameter includes an indication of whether the user equipment supports small data transmission; the mobility management entity determines a small data transmission policy according to the small data transmission parameter; the mobility management entity sends the determined small data transmission policy to the user equipment; and the mobility management entity performs the small data transmission with the user equipment according to the small data transmission policy. In this way, the mobility management entity and the user equipment exchange information about whether the mobility management entity or the user equipment can support a small data transmission feature, thereby improving an existing small data transmission mechanism, and preventing a waste of a signaling resource due to use of a data plane radio bearer to transmit small data in the prior art.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

In the embodiments of the present invention, negotiation of small data transmission performed by using a mobility management entity is proposed, thereby improving an existing small data transmission solution. In some specific embodiments, establishment of a dedicated core network bearer for small data transmission is further proposed, so as to increase data transmission efficiency; and in some specific embodiments, establishment of an IP packet list of small data for data transmission is further provided, so that small data data of a plurality of units can be transmitted each time and transmission efficiency is increased. The following describes the foregoing solutions by using specific embodiments.

Small data is encapsulated in a non access stratum (Non Access Stratum, NAS) message and transferred to an MME, the MME routes the small data to an SGW, and the SGW transfers the small data to a PGW by using a user plane bearer on a core network side of the SGW. In this solution, both a UE and the MME need to support this feature, but in the prior art, there is no method about how a network and a UE transfer information about whether a small data feature is supported.

Figure 1:
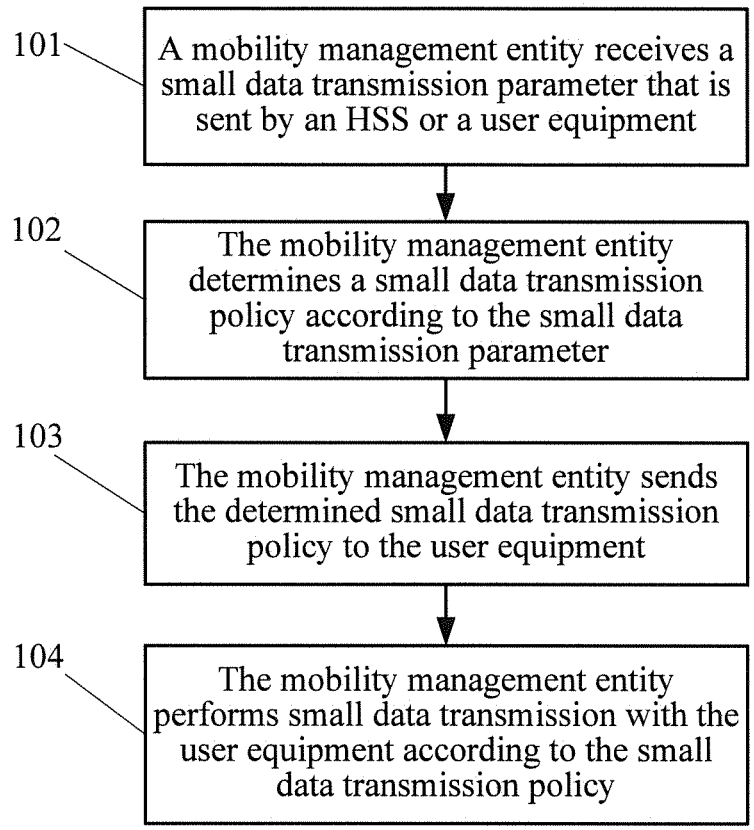
FIG. 1 is a schematic flowchart of a data transmission method according to an embodiment of the present invention.

In order to solve the foregoing technical problem, the present invention provides the following technical solutions:

FIG. 1 is a schematic flowchart of a data transmission method according to an embodiment of the present invention, where the method includes:

101: A mobility management entity receives a small data transmission parameter that is sent by a home subscriber server HSS or a user equipment, where the small data transmission parameter includes an indication of whether the user equipment supports small data transmission.

102: The mobility management entity determines a small data transmission policy according to the small data transmission parameter.

103: The mobility management entity sends the determined small data transmission policy to the user equipment.

104: The mobility management entity performs the small data transmission with the user equipment according to the small data transmission policy.

Figure 2:
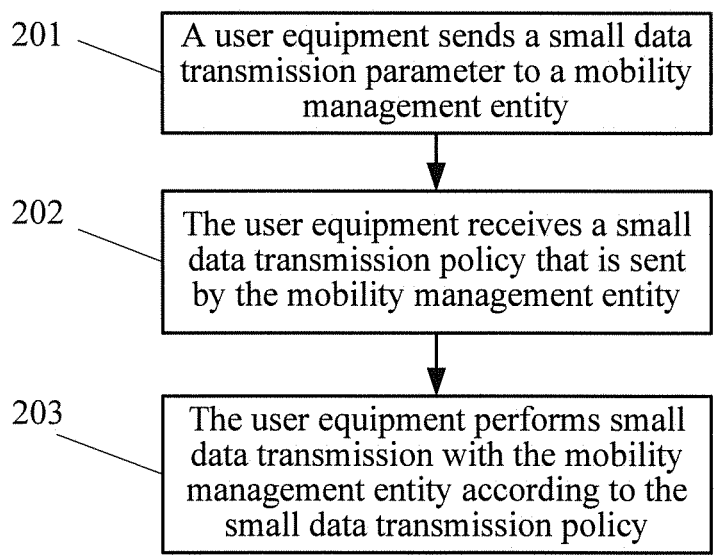
FIG. 2 is another schematic flowchart of a data transmission method according to an embodiment of the present invention.

The foregoing embodiment focuses on the MME, and in an embodiment shown in FIG. 2, another schematic flowchart of implementation of a data transmission method according to the embodiment of the present invention is described from the perspective of a mobile terminal.

201: A user equipment sends a small data transmission parameter to a mobility management entity, where the small data transmission parameter includes an indication of whether the user equipment supports small data transmission, so that the mobility management entity determines a small data transmission policy according to the small data transmission parameter. The small data transmission parameter further includes a service feature of small data, where the service feature of the small data includes one or more of the following: the amount of data that is transmitted each time, a data transmission direction, a data transmission duration, and the number of times of transmission within the duration.

202: The user equipment receives the small data transmission policy that is sent by the mobility management entity.

203: The user equipment performs the small data transmission with the mobility management entity according to the small data transmission policy.

For example, the user equipment sends a small data container including uplink small data to the mobility management entity, where the small data container includes a bearer identification and an IP packet corresponding to the identification, so that the mobility management entity determines a tunnel endpoint identifier (TEID) of a network side and an IP address of the mobility management entity according to the bearer identification in the small data container, constructs the IP packet corresponding to the identification into a GTP-U packet, and transmits the GTP-U packet to the network side.

Meanwhile, before step 203, the method further includes: before sending the small data container including the uplink small data, the user equipment checks whether a transmission bearer conforms to the small data transmission policy; and when a checking result is that the transmission bearer conforms to the small data transmission policy, the user equipment performs the small data transmission on the transmission bearer according to the small data transmission policy, and when the checking result is that the transmission bearer does not conform to the small data transmission policy, the user equipment triggers an ordinary data transmission procedure to transmit the data.

According to the present invention, a mobility management entity receives a small data transmission parameter that is sent by a home subscriber server (HSS) or a user equipment, where the small data transmission parameter includes an indication of whether the user equipment supports small data transmission; the mobility management entity determines a small data transmission policy according to the small data transmission parameter; the mobility management entity sends the determined small data transmission policy to the user equipment; and the mobility management entity performs the small data transmission with the user equipment according to the small data transmission policy. In this way, the mobility management entity and the user equipment exchange information about whether the mobility management entity or the user equipment can support a small data transmission feature, thereby improving an existing small data transmission mechanism, and preventing a waste of a signaling resource due to use of a data plane radio bearer to transmit small data in the prior art.

Figure 3:
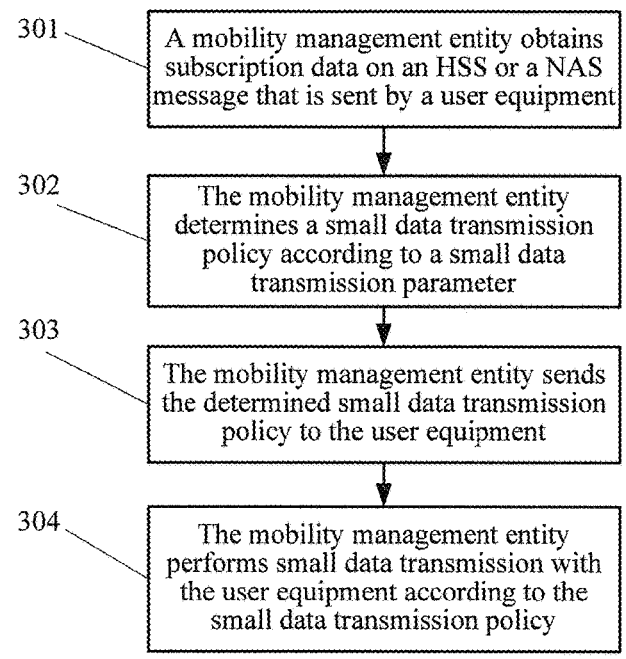
FIG. 3 is another schematic flowchart of a data transmission method according to an embodiment of the present invention.

FIG. 3 is another schematic flowchart of a data transmission method according to an embodiment of the present invention, where the method includes:

301: A mobility management entity obtains subscription data on a home subscriber server (HSS), where the subscription data includes a small data transmission parameter, or a NAS message that includes a small data transmission parameter and is sent by a user equipment, where the small data transmission parameter may include an indication of whether the user equipment supports small data transmission.

The NAS message may be an attach request, a periodic tracking area request, a PDN connection request, or the like.

In this step, the mobility management entity may receive a NAS message that includes a small data transmission parameter and is sent by a user equipment, or the mobility management entity may receive a NAS message that is sent by a user equipment (the message includes an indication that the user equipment supports small data transmission), and makes a request to an HSS for obtaining subscription data of the user equipment, where the subscription data includes a small data transmission parameter of the user equipment; and at the same time, in addition to obtaining information about the small data transmission parameter from the user equipment or the HSS, the mobility management entity configures a transmission policy for small data transmission, such as a bearer type (dedicated bearer or default bearer) or various parameters (for example, QoS) of a bearer.

The small data transmission parameter is at least an indication of whether small data transmission is supported, and may further include a service feature of small data, where the indication of whether small data transmission is supported may simply indicate whether small data transmission is supported; and if the small data transmission parameter further includes the service feature of the small data, the service feature of the small data may include one or more of the following: the amount of data that is transmitted each time (that is, the total amount of data that is transmitted each time), a data transmission direction (uplink, downlink, or both directions), a data transmission duration, and the number of times of transmission within the duration. For example, the small data transmission parameter may be (uplink transmission, 5 times, 100 bytes).

When the small data transmission parameter is transmitted to the mobility management entity, a new parameter may be added to an existing message, or the parameter may be transferred as a part of an existing parameter, for example, as apart of a network capability, to the mobility management entity.

302: The mobility management entity determines a small data transmission policy according to the small data transmission parameter.

Definitely, the small data transmission policy that is notified to a UE side is usually content related to the UE side, and some policies of a network side (for example, establishment of a bearer) do not need to be notified to the UE.

The mobility management entity determines, according to the small data transmission parameter, a bearer type for performing the small data transmission with the network side, where the bearer type includes a dedicated bearer or a default bearer.

Further, the mobility management entity determines, according to the small data transmission parameter, an indication of establishing a dedicated bearer for the small data transmission and a parameter of the dedicated bearer; or the mobility management entity determines, according to the small data transmission parameter, adoption of a default bearer for the small data transmission and a parameter of the default bearer; or the mobility management entity sends the small data transmission parameter to the network side, so that the network side determines, according to an operator policy configured on the network side, a bearer for the small data transmission; and the mobility management entity receives an indication of a small data bearer that is determined by the network side, where the indication is used to identify establishment of a dedicated bearer for the small data transmission or identify adoption of a default bearer for the small data transmission.

The mobility management entity may determine, according to the small data transmission parameter, a bearer for small data transmission; and when an operator policy is configured on the mobility management entity, the bearer may also be established with reference to the operator policy. When it is determined that a dedicated bearer is adopted for transmission, the small data transmission policy includes an indication of establishing the dedicated bearer for small data transmission and a parameter for establishing the dedicated bearer, and the mobility management entity notifies the network side of the small data transmission parameter, so that the network side initiates establishment of the dedicated bearer to perform the small data transmission; and when it is determined that a default bearer is adopted for transmission, the small data transmission policy includes an indication of adopting the default bearer for small data transmission and a parameter of the default bearer.

If in the small data transmission policy, it is determined that a default or dedicated bearer is adopted for small data transmission, when the mobility management entity performs the small data transmission according to the small data transmission policy, before the user equipment sends uplink data, the user equipment checks whether a transmission bearer (that is, the dedicated bearer or the default bearer) conforms to the small data transmission policy; and when a checking result is that the transmission bearer conforms to the small data transmission policy, the user equipment performs the small data transmission on the transmission bearer according to the small data transmission policy, and when the checking result is that the transmission bearer does not conform to the small data transmission policy, the user equipment triggers an ordinary data transmission procedure to transmit the data.

That the mobility management entity determines a small data transmission policy of a UE side includes:

In one case, if the mobility management entity learns, according to the small data transmission parameter, that the user equipment supports small data transmission optimization, the mobility management entity notifies the user equipment of a small data transmission policy configured by an operator, that is, the mobility management entity transfers a policy about small data in a network to the UE, and the UE follows the policy when transmitting data.

In another case, if the mobility management entity learns, according to the small data transmission parameter, that the user equipment supports small data transmission optimization, the mobility management entity selects, according to the parameter, a policy, from a plurality of small data transmission policies configured by an operator, as a current small data transmission policy, and notifies the user equipment of the policy, for example, when determining the small data transmission policy, the mobility management entity may determine a current small data transmission policy of the UE according to an obtained small data transmission parameter and a locally stored operator small data policy, or may notify a network side device of various parameters and policies that are obtained by the mobility management entity, and after the network side determines a current small data transmission policy of the UE, the mobility management entity obtains the small data transmission policy from the network side.

The small data transmission policy that is transmitted to the UE may generally include content such as a limit on the maximum number of times of transmission and a limit on the maximum number of bytes in transmission.

For example, when the UE is in an IDLE state, the UE maps a service to a transmission bearer by detecting a TFT; if the UE finds, through a check, that the transmission bearer is used for small data transmission (that is, the bearer is a small data bearer) and conforms to a small data policy transferred by a network, the UE uses a corresponding small data policy to perform transmission, and maps data to a signaling radio bearer (SRB) (the bearer may be a default bearer, or may be a dedicated bearer) to perform transmission; and if the data is mapped to an ordinary bearer or cannot be transmitted according to the small data policy, and the UE is in an IDLE state, an ordinary data transmission procedure is triggered, that is, the data is mapped to a data radio bearer (RDB) to perform transmission. If a service mapped to a small data bearer and a service mapped to an ordinary bearer arrive at the same time, a normal Service Request procedure is triggered, an RIDE is established, and the small data bearer is not used to perform transmission.

In still another case, when the UE has a plurality of pieces of service data to transmit, the UE maps the service data to different bearers by using a TFT; if the service data conforms to a small data policy transferred by the NNE, the UE uses the small data policy to perform transmission; otherwise, a DRB is established to perform service data transmission.

Before sending downlink data to the user equipment, a network side checks whether a transmission bearer conforms to a small data transmission policy; when a checking result is that the transmission bearer conforms to the small data transmission policy, the network side performs small data transmission according to the small data transmission policy on the transmission bearer; and if the checking result is that the transmission bearer does not conform to the small data transmission policy, the network side triggers an ordinary data transmission procedure to transmit the data.

For example, if the UE is in an idle state and downlink data arrives, and if the transmission bearer is a specific small data bearer, an SGW transmits the data to the MME by piggybacking the data in a Downlink data notification message; and if data transmitted by using an ordinary bearer arrives and the UE is in an idle state, the SGW triggers a normal Service Request procedure without using the small data bearer to perform transmission.

When downlink data arrives at the SGW and there is service data transmitted by using a plurality of bearers, if the service data conforms to a previously negotiated small data policy, the SGW uses the small data policy to perform transmission; otherwise, a DRB is established to perform service data transmission.

303: The mobility management entity sends the determined small data transmission policy to the user equipment.

304: The mobility management entity performs the small data transmission with the user equipment according to the small data transmission policy.

According to the embodiment of the present invention, a mobility management entity receives a small data transmission parameter that is sent by a home subscriber server HSS or a user equipment, where the small data transmission parameter includes an indication of whether the user equipment supports small data transmission; the mobility management entity determines a small data transmission policy according to the small data transmission parameter; the mobility management entity sends the determined small data transmission policy to the user equipment; and the mobility management entity performs the small data transmission with the user equipment according to the small data transmission policy. In this way, the mobility management entity and the user equipment exchange information about whether the mobility management entity or the user equipment can support a small data transmission feature, thereby improving an existing small data transmission mechanism, and preventing a waste of a signaling resource due to use of a data plane radio bearer to transmit small data in the prior art.

Another application scenario of the present invention is that an SGW does not support small data transmission, and in this case, the following method is adopted.

When a network side device does not support the foregoing feature of performing small data transmission by using a small data transmission bearer, an MME may replace an eNB to assign a user plane TEID and a network side device address to the network side device, so as to perform data transmission. In this case, a small data transmission policy may not include an indication about determination of a transmission bearer. Since small data transmission is divided into two directions: an uplink direction and a downlink direction, the following describes the two directions separately.

Uplink direction: When uplink small data is transmitted, the mobility management entity receives a small data container that is sent by a user equipment, where the small data container includes a bearer identification and an IP packet corresponding to the identification; and the mobility management entity determines a tunnel endpoint identifier (Tunnel Endpoint Identifier, TEID) of a network side and an IP address of the mobility management entity according to the bearer identification in the small data container, constructs the IP packet corresponding to the identification into a GTP-U packet, and transmits the GTP-U packet to the network side.

Downlink direction: When downlink small data is transmitted, the mobility management entity assigns a downlink TEID and a downlink address, and notifies a network side of the TEID, the address, and a bearer identification; the mobility management entity receives a GTP-U packet that is sent by the network side, where small data that needs to be sent is encapsulated in the GTP-TJ packet; the mobility management entity constructs the received GTP-U packet into a small data container and transmits the small data container to the user equipment; and when transmission of the downlink data is completed, the mobility management entity instructs the network side to delete the TEID and the address.

When a network side device does not support the foregoing feature of performing small data transmission by using a small data transmission bearer, an MME may replace an eNB to assign a user plane TEID and a network side device address to the network side device, so as to perform data transmission. In this way, without being upgraded, the SGW can support a small data transmission feature, and a waste of a resource is prevented.

Another application scenario of the present invention is that the prior art only supports that a small data transmission container is used to transmit one IP packet, which causes a waste of a signaling resource when a plurality of IP packets needs to be transmitted. In order to solve this problem, the present invention proposes the following technical solutions:

No matter whether small data transmission is performed by using a dedicated bearer or a default bearer or small data transmission is performed by establishing a channel between an MME and a network side device in a manner in which the MME replaces an eNB to assign a TEID and an address to the network side device, when the mobility management entity performs small data transmission according to the small data transmission policy, transmitted small data is encapsulated in a small data container or a GTP-U packet for transmission.

The small data container may include an IP packet list, where the IP packet list includes a plurality of bearer identifications and IP packets corresponding to the identifications. In a downlink direction only, an IP packet list may be constructed by the network side device or the mobility management entity. That is, the small data container includes an IP packet list, where the IP packet list includes a plurality of bearer identifications and IP packets corresponding to the identifications, or the GTP-U packet includes an IP packet list, where the IP packet list includes a plurality of bearer identifications and IP packets corresponding to the identifications.

According to the present invention, whether small data transmission is performed by using a dedicated bear or a default bearer or small data transmission is performed by establishing a channel between an MME and a network side device in a manner in which the MME replaces an eNB to assign a TEID and an address to the network side device, when the mobility management entity performs small data transmission according to the small data transmission policy, transmitted small data is encapsulated in a small data container or a GTP-U packet for transmission; and when a plurality of pieces of small data is transmitted, a plurality of IP packets may be encapsulated in one signaling message for transmission, thereby preventing a waste of a resource.

Some implementation details of the foregoing three cases are further described in subsequent embodiments. Generally, the foregoing separately describes a process in which the network side and the UE exchange the small data transmission policy, a processing process of the MME when the SGW does not support small data transmission, and a process in which the UE or the SGW constructs the IP packet list to transmit a plurality of bearers once. It needs to be understood that the foregoing three processes may all exist in a same embodiment, or one or two of the foregoing processes may be adopted in combination with the prior art in one embodiment, which is limited in the embodiment of the present invention.

Figure 4:
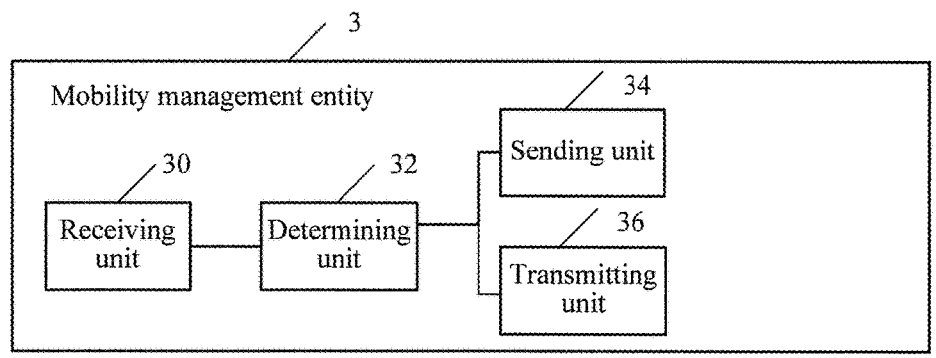
FIG. 4 is a schematic diagram of composition of a mobility management entity according to an embodiment of the present invention.

Correspondingly, an embodiment of the present invention further discloses a mobility management entity. As shown in FIG. 4, the mobility management entity 3 includes:

a receiving unit 30, configured to receive a small data transmission parameter that is sent by a home subscriber server HSS or a user equipment, where the small data transmission parameter includes an indication of whether the user equipment supports small data transmission;

a determining unit 32, configured to determine a small data transmission policy according to the small data transmission parameter that is received by the receiving unit;

a sending unit 34, configured to send the small data transmission policy that is determined by the determining unit to the user equipment; and a transmitting unit 36, configured to perform the small data transmission with the user equipment according to the small data transmission policy that is determined by the determining unit.

The determining unit 32 may be configured to determine, according to the small data transmission parameter that is received by the receiving unit, a bearer type for performing the small data transmission with a network side, where the bearer type includes a dedicated bearer or a default bearer.

Figure 5A:
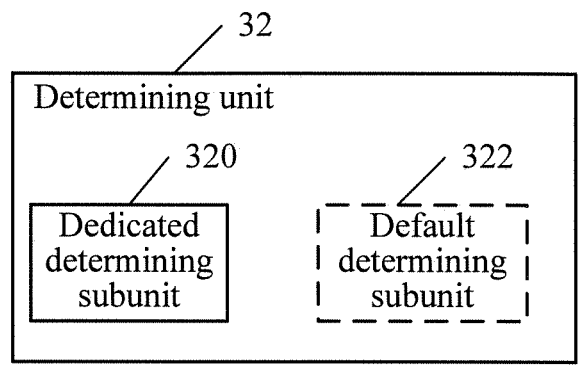
FIG. 5a to FIG. 5d are schematic diagrams of composition of component units in a mobility management entity according to an embodiment of the present invention.

As shown in FIG. 5a, the determining unit 32 may include:

a dedicated determining subunit 320, configured to determine, according to the small data transmission parameter that is received by the receiving unit, an indication of establishing a dedicated bearer for the small data transmission and a parameter of the dedicated bearer; or a default determining subunit 322, configured to determine, according to the small data transmission parameter that is received by the receiving unit, adoption of a default bearer for the small data transmission and a parameter of the default bearer.

Figure 5B:
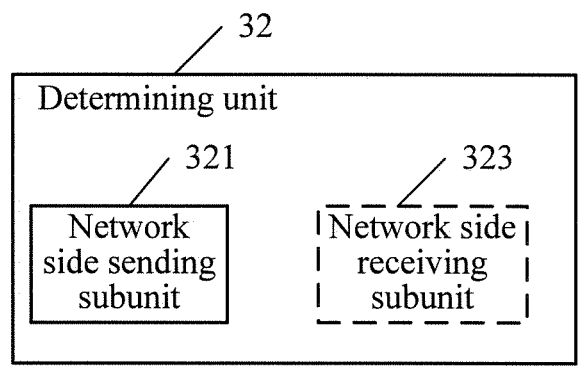

Alternatively, as shown in FIG. 5b, the determining unit 32 includes:

a network side sending subunit 321, configured to send the small data transmission parameter that is received by the receiving unit to the network side, so that the network side determines, according to an operator policy configured on the network side, a bearer for the small data transmission; or a network side receiving subunit 323, configured to receive an indication of a small data bearer that is determined by the network side, where the indication of the small data bearer is used to identify establishment of a dedicated bearer for the small data transmission or identify adoption of a default bearer for the small data transmission.

Figure 5C:
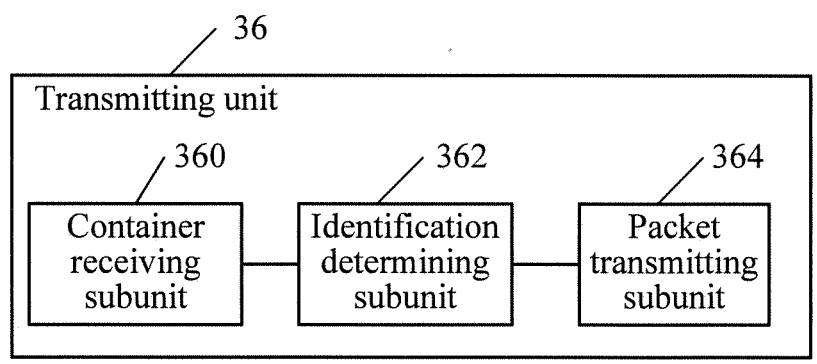

As shown in FIG. 5c, the transmitting unit 36 includes:

a container receiving subunit 360, configured to receive a small data container that includes uplink small data and is sent by the user equipment, where the small data container includes a bearer identification and an IP packet corresponding to the identification;

an identification determining subunit 362, configured to determine, according to the bearer identification in the small data container that is received by the container receiving subunit, a tunnel endpoint identifier TEID of the network side and an IP address of the mobility management entity; and a packet transmitting subunit 364, configured to construct the IP packet corresponding to the identification into a GTP-U packet, and transmit the GTP-U packet to the network side according to the TEID and the IP address that are determined by the identification determining subunit.

Figure 5D:
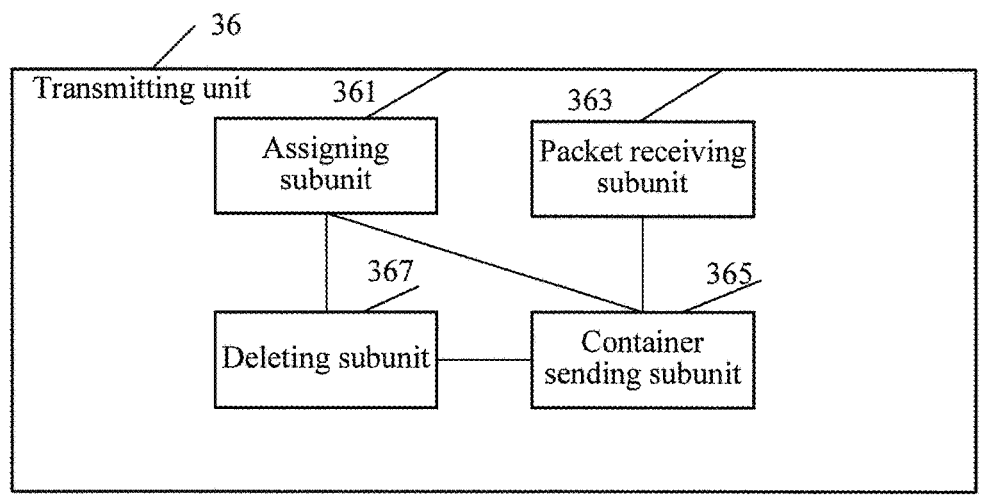

As shown in FIG. 5d, the transmitting unit 36 may also include:

an assigning subunit 361, configured to: when downlink small data is transmitted, assign a downlink TEID and an IP address of the mobility management entity, and notify the network side of the TEID, the address, and a bearer identification;

a packet receiving subunit 363, configured to receive a GTP-U packet that is sent by the network side, where small data that needs to be sent is encapsulated in the GTP-U packet;

a container sending subunit 365, configured to construct the GTP-U packet that is received by the packet receiving subunit into a small data container, and transmit the small data container to the user equipment according to the TEID and the IP address of the mobility management entity that are assigned by the assigning subunit; and a deleting subunit 367, configured to, when transmission of the downlink data is completed, instruct the network side to delete the TEID and the IP address of the mobility management entity that are assigned by the assigning subunit.

Figure 6:
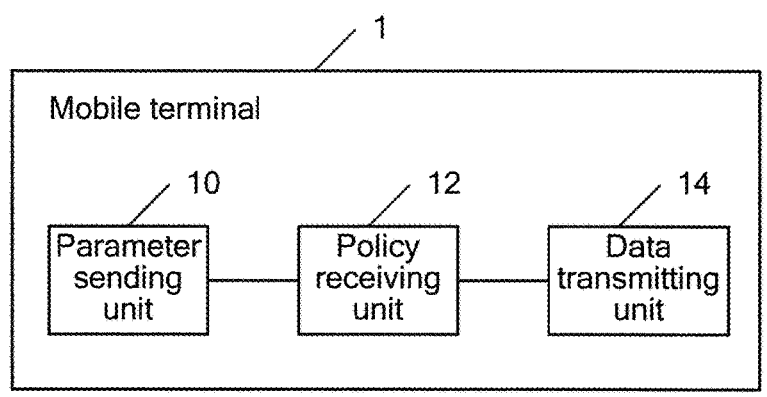
FIG. 6 is a schematic diagram of composition of a mobile terminal according to an embodiment of the present invention.

Moreover, an embodiment of the present invention further provides a mobile terminal to be used in the foregoing small data transmission method. As shown in FIG. 6, the mobile terminal 1 may include: a parameter sending unit 10, configured to send a small data transmission parameter to a mobility management entity, where the small data transmission parameter includes an indication of whether the mobile terminal supports small data transmission, so that the mobility management entity determines a small data transmission policy according to the small data transmission parameter; a policy receiving unit 12, configured to receive the small data transmission policy that is sent by the mobility management entity, where the small data transmission policy is determined by the mobility management entity according to the small data transmission parameter that is sent by the parameter sending unit; and a data transmitting unit 14, configured to perform the small data transmission with the mobility management entity according to the small data transmission policy that is received by the policy receiving unit.

Figure 7A:
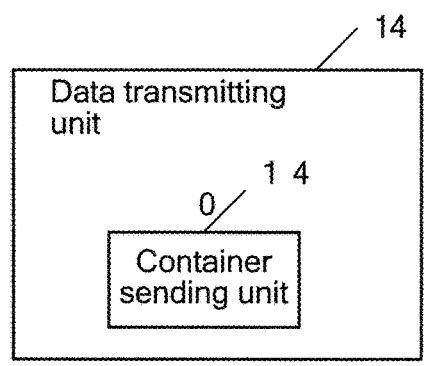
FIG. 7a is a schematic diagram of composition of a data transmitting unit in a mobile terminal according to an embodiment of the present invention.

As shown in FIG. 7a, the data transmitting unit 14 may include: a container sending unit 140, configured to send a small data container including uplink small data to the mobility management entity, where the small data container includes a bearer identification and an IP packet corresponding to the identification, so that the mobility management entity determines a tunnel endpoint identifier TEID of a network side and an IP address of the mobility management entity according to the bearer identification in the small data container, constructs the IP packet corresponding to the identification into a GTP-U packet, and transmits the GTP-U packet to the network side.

Figure 7B:
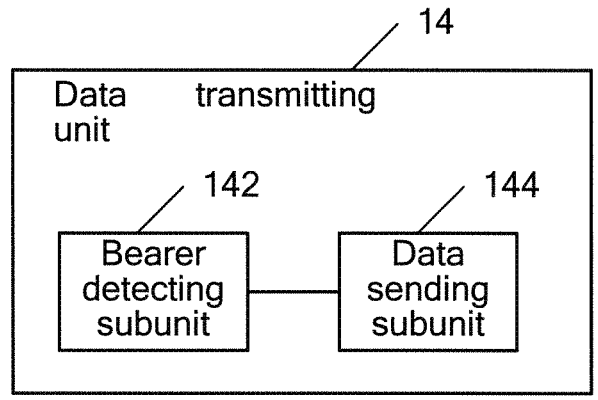
FIG. 7b is another schematic diagram of composition of a data transmitting unit in a mobile terminal according to an embodiment of the present invention.

Alternatively, as shown in FIG. 7b, the data transmitting unit may include: a bearer detecting subunit 142, configured to, before the data transmitting unit sends uplink small data, check whether a transmission bearer conforms to the small data transmission policy; and a data sending subunit 144, configured to: when a checking result obtained by the bearer detecting subunit is that the transmission bearer conforms to the small data transmission policy, perform small data transmission according to the small data transmission policy on the transmission bearer; and when the checking result is that the transmission bearer does not conform to the small data transmission policy, trigger an ordinary data transmission procedure to transmit the data.

Generally, the foregoing separately describes functional composition of the mobility management entity and functional composition of the mobile terminal according to the embodiments of the present invention, and a small data transmission process in which the two participate; and the following describes the technical solutions in the present invention in further detail by describing embodiments in more specific environments.

FIG. 8 to FIG. 11 show four specific embodiments of a data transmission method according to embodiments of the present invention. The embodiments described in FIG. 8 and FIG. 9 mainly describe processes of information exchange between a UE and an MME before small data transmission; in addition to processes of information exchange between a UE and an NNE, FIG. 10 and FIG. 11 further focus on describing processes in which a network side determines a small data transmission bearer and negotiates about establishment of a bearer when necessary in different cases.

Figure 8:
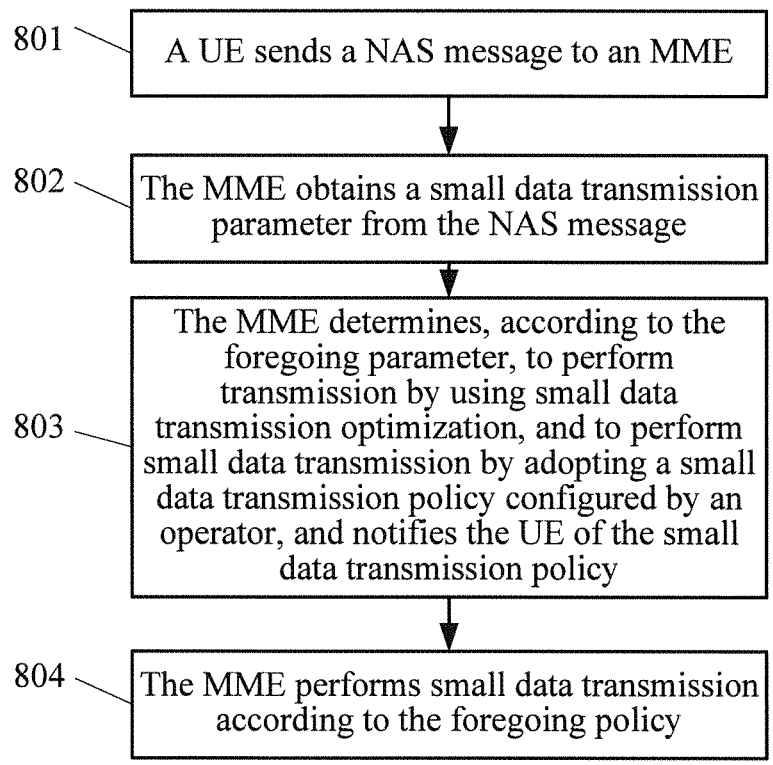
FIG. 8 is a schematic flowchart of a process of information exchange between a UE and an MME before small data transmission according to an embodiment of the present invention.

FIG. 8 shows another specific embodiment of a data transmission method according to an embodiment of the present invention. In this embodiment, an operator configures a small data transmission policy only in an NNE. The method includes the following steps:

801: A UE sends a NAS message to an MME, where the NAS message includes a small data transmission parameter.

For specific content of the small data transmission parameter in the NAS message, reference may be made to the description in the embodiment related to FIG. 2. The small data transmission parameter is at least an indication of whether small data transmission is supported, and may further include a service feature of small data. If the parameter includes an indication of whether small data transmission is supported, the indication may simply indicate whether small data transmission is supported; and if the parameter further includes a service feature of small data, the service feature of the small data may include one or more of the following: the amount of data that is transmitted each time (that is, the total amount of data that is transmitted each time), a data transmission direction (uplink, downlink, or both directions), a data transmission duration, and the number of times of transmission within the duration. For example, the small data transmission parameter may be (uplink transmission, 5 times, 100 bytes).

802: The MME obtains the small data transmission parameter from the NAS message.

803: The MME determines a small data transmission policy according to the small data transmission parameter, where the small data transmission policy includes, for example, a part of policies configured by an operator, and notifies the UE of the small data transmission policy.

Content of the policy corresponds to the content of the small data transmission parameter. The small data transmission policy that is notified to the UE may generally include content such as a limit on the maximum number of times of transmission and a limit on the maximum number of bytes in transmission.

Definitely, this step may further include a process in which a network side determines a small data transmission bearer. For details, reference may be made to the description in the embodiments shown in FIG. 10 and FIG. 11.

804: The MME performs small data transmission according to the foregoing policy.

In this embodiment, when the MME learns that the UE supports small data optimization transmission, the MME notifies the UE of adoption of small data transmission optimization to perform transmission and the number of times of transmission, so that an objective of efficiently establishing a small data transmission environment to perform small data transmission can be achieved.

Figure 9:
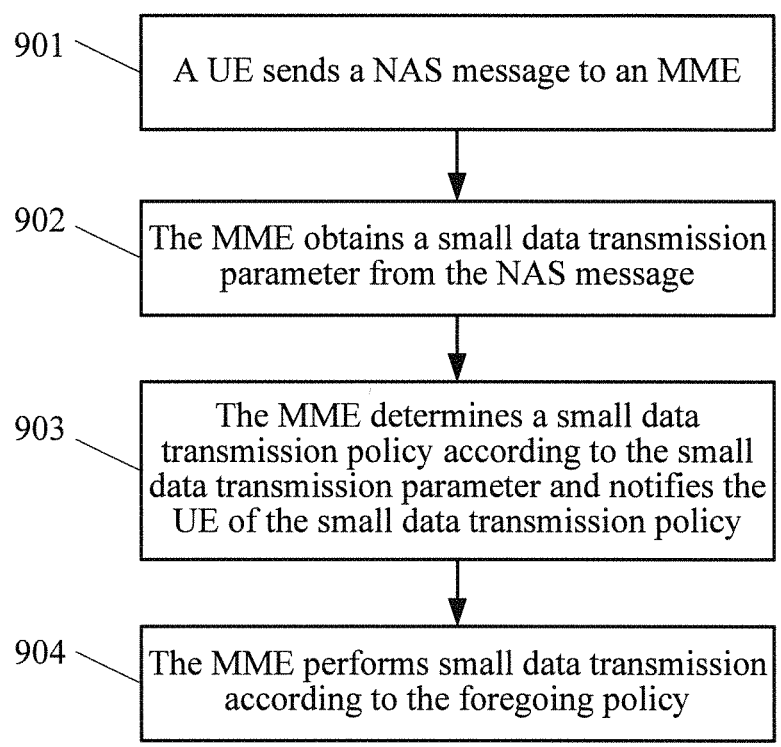
FIG. 9 is another schematic flowchart of a process of information exchange between a UE and an MME before small data transmission according to an embodiment of the present invention.

FIG. 9 shows another specific embodiment of a data transmission method according to an embodiment of the present invention. In this embodiment, an operator configures a plurality of small data transmission policies in an MME. The method includes the following steps:

901: A UE sends a NAS message to an MME.

902: The MME obtains a small data transmission parameter from the NAS message, where content of the small data transmission parameter includes, for example, an indication of whether the UE user equipment supports small data transmission, and may further include the number of times of transmission within a duration, a transmission direction, and the like.

903: The MME determines, according to the foregoing parameter, to use small data transmission optimization to perform transmission, and determines, according to the parameter, a policy for currently performing small data transmission among a plurality of small data transmission policies configured by an operator, and notifies the UE of the policy.

Content of the small data transmission policy corresponds to the foregoing content of the small data transmission parameter, for example, the small data transmission policy that is notified to the UE may include: adoption of small data transmission optimization to perform transmission, the maximum number of times of transmission, and the like. Definitely, a small data transmission policy that is notified to a network side may include more content, for example, content related to a bearer for small data transmission, that is, information about which the MME may further negotiate with another device of the network side when the MME determines the policy for currently performing small data transmission, for example, information related to negotiation about establishment of a dedicated bearer. For details, reference may be made to the description in the embodiments shown in FIG. 10 and FIG. 11.

904: The MME performs small data transmission according to the foregoing policy.

In this embodiment, when the MME learns that the UE supports small data optimization transmission, the MME selects a specific policy according to a related parameter, and notifies the UE of the policy, so that an objective of efficiently establishing a small data transmission environment based on negotiation to perform small data transmission can be achieved.

Figure 10:
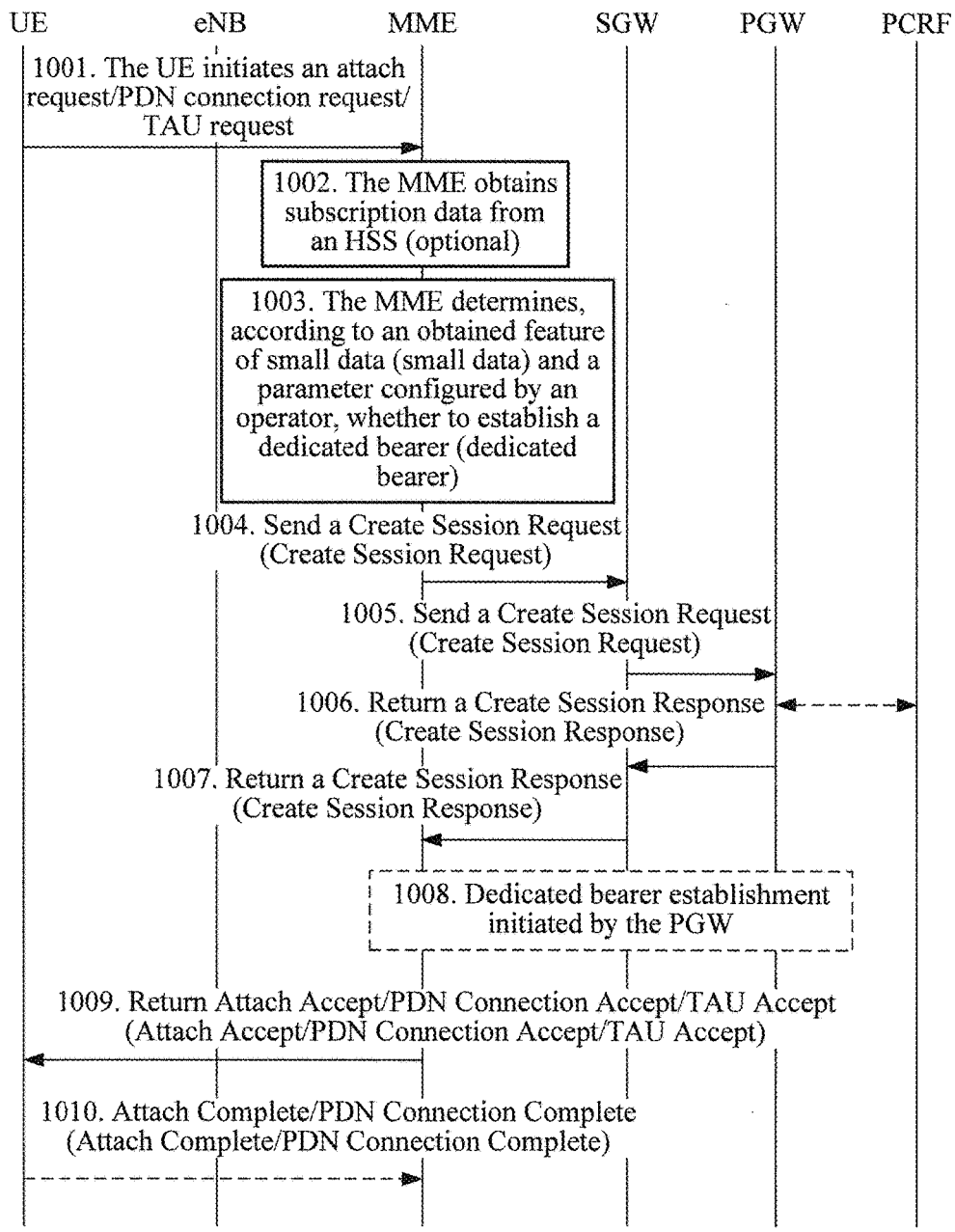
FIG. 10 is a schematic flowchart of a process in which a network side determines a small data transmission bearer and negotiates establishment of a bearer according to an embodiment of the present invention.

FIG. 10 shows a process of determination and notification of a small data transmission policy before small data transmission. In this scenario, a device in a network and a user equipment record which bearer belongs to a small data bearer, so as to adopt a small data transmission mechanism to perform data transmission when performing the data transmission. In this embodiment, an LTE communications system is used as an example, and the network side in the foregoing embodiment refers to a P-GW, an S-GW, or the like in the LTE communications system. Definitely, the LTE communications system in this embodiment may also be another wireless communications system, and a network element in this embodiment may be replaced with a similar network element in the another wireless communications system, which are not described one by one herein.

1001: A user equipment (UE) initiates an attach request/PDN connection request/TAU request, where the request may carry a small data transmission parameter.

The parameter may be a service feature of small data, or may simply indicate whether small data transmission is supported; if the parameter is the service feature of the small data, the parameter may include a combination of one or more parameters of the following parameters: the amount of data that is transmitted each time, a data transmission direction (uplink, downlink, or both directions), a duration (a data transmission duration), the number of times of transmission (the number of times of transmission within the duration), and a data size. For example, the parameter may be one parameter or a combination of several parameters, for example, may be (uplink transmission, 5 times, 100 bytes). The UE may also not carry the parameter, and an MME may obtain the parameter from subscription data that is obtained from an HSS.

The Small data parameter may be a new parameter added to an existing message, or may be transferred as a part of existing parameters, for example, as a part of network capabilities, to the MME.

1002: The MME obtains the subscription data from the HSS (this step is optional). In this embodiment, the obtained subscription data supports the UE in having a feature of small data; in addition, that the UE supports a service feature of small data may also be saved in the subscription data. Moreover, some parameters may also be configured in the MME for the small data transmission (this step is optional), such as a used bearer type (dedicated bearer or default bearer) and a bearer parameter (Qos or the like). Definitely, a manner for obtaining the small data transmission parameter may also be that an eNB delivers a small data policy by using a broadcast message; and the UE may also obtain the small data parameter by using OTA or OMA DM, or by using an RRC message (such as RRCConnectionSetupComplete or RRCConnectionReconfiguration).

1003: The MME determines, according to the obtained feature of the small data and a parameter configured by an operator, whether to establish a dedicated bearer.

1004 to 1008: The MME negotiates with a network side about establishment of a bearer. The process is divided into three cases, and the following describes the three cases separately.

Case 1: If a type of the bearer determined to be established by the MME is a default bearer, the NNE may transfer a service feature of small data (the service feature may be obtained from the UE or the subscription data in the HSS) to an SGW and a PGW by using a Create Session Request. The PGW may transfer the service feature of the small data to a PCRF. The PGW or the PCRF may modify a parameter of the bearer according to a policy configured by an operator.

Case 2: If the MME determines that a dedicated bearer needs to be established for small data, the MME adds a small data transmission parameter to a Create Session Request, where the parameter may carry a Qos parameter of a small data unit (bearer) In addition, the MME may transfer a service feature of small data (the service feature may be obtained from the UE or the subscription data in the HSS) to an SGW and a PGW. The PGW may transfer the service feature of the small data to a PCRF. The PGW or the PCRF may also modify, according to a small data policy configured on the PGW or the PCRF, a small data parameter that is transferred by the MME; subsequently, the PGW initiates a dedicated bearer establishment procedure.

Case 3: If a bearer type is determined by a PGW or a PCRF, the MME may transfer a service feature of small data (the service feature may be obtained from the UE or the subscription data in the HSS) to an SGW and the PGW by using a Create Session Request. The PGW may transfer the service feature of the small data to the PCRF. The PGW or the PCRF determines, according to an operator policy configured on the PGW or the PCRF, whether to use a default bearer or to establish a dedicated bearer to transmit small data data; and if the PCRF or the PGW determines to use the dedicated bearer, a dedicated bearer establishment procedure is initiated. In the bearer establishment process, an indication that is of a small data bearer and is determined by the network side is sent to the MME, where the indication is used to identify establishment of a dedicated bearer for the small data transmission or identify adoption of a default bearer for the small data transmission.

In the foregoing three cases, the SGW and the PGW return a Create Session Response to the MME. For Case 2 and Case 3, if the MME or the PGW determines to use a dedicated bearer to transfer small data, the PGW initiates a dedicated bearer establishment procedure to establish a dedicated bearer.

1009: The MME returns Attach Accept/PDN Connection Accept/TAU Accept to the UE, and transfers the small data transmission policy to the UE. Before transmitting data, the UE checks whether a local resource conforms to a requirement of the small data policy. If the local resource conforms to the requirement of the small data policy, small data optimization transmission is used. Moreover, the MME may also indicate to the UE which bearer is used for small data optimization.

1010: The UE transfers Attach Complete/PDN Connection Complete/TAU complete to the MME.

Figure 11:
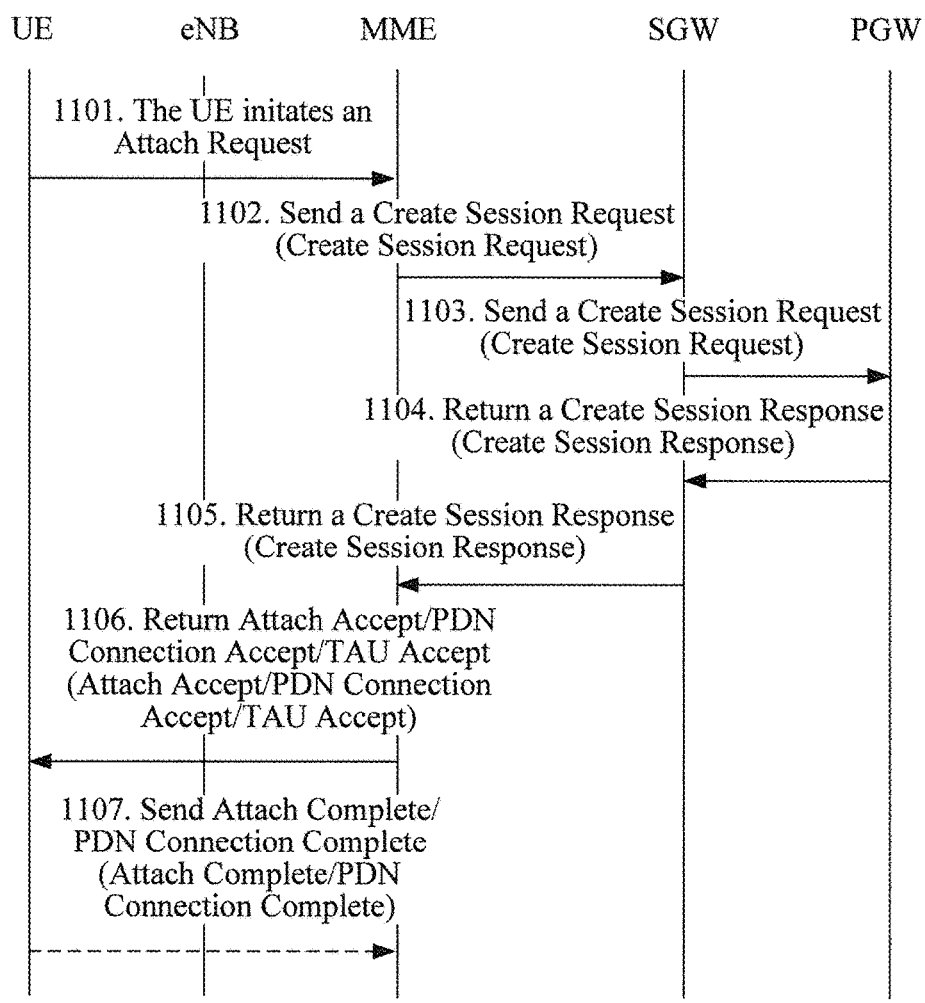
FIG. 11 is a schematic flowchart of a process in which a network side determines a small data transmission bearer according to an embodiment of the present invention.

FIG. 11 shows a case based on a non-dedicated bearer, that is, Case 1 of step 1004 to step 1008 shown in FIG. 10, a process of which is as follows:

1101: A UE sends an attach request to an MME, where the request may carry a small data indication parameter to indicate to the MME that the UE supports small data optimization. Definitely, the UE may also not carry the parameter similarly, and the MME learns whether the UE supports small data optimization from subscription information of the UE in an HSS.

1102: The MME sends a Create Session Request to an SGW, where the request may carry a parameter small data indication used to indicate to the SGW or a PGW that the UE supports small data optimization; and when receiving downlink data, the SGW determines, according to this indication in combination with a small data policy configured on the SGW by an operator, whether to use a small data optimization procedure.

1103: The SGW sends a Create Session Request to the PGW.

1104: The PGW returns a Create Session Response to the SGW.

1105: The SGW returns a Create Session Response to the MME.

1106: The MME transfers the small data transmission policy configured by the operator to the UE by using Attach Accept. Before transmitting data, the UE checks whether the data conforms to the small data policy, so as to determine whether to use small data optimization transmission.

1107: The UE transfers Attach Complete to the MME.

The embodiments shown in FIG. 10 and FIG. 11 further describe a process of determination and notification of a small data transmission policy according to the embodiments of the present invention. After the process is completed, the UE and a network side perform data transmission according to the determined small data transmission policy.

For example, when the UE has a plurality of pieces of service data to transmit, the UE maps the service data to different bearers (a dedicated bearer, a default bearer, or a bearer determined according to determination of the UE) by using a TFT. If the service data conforms to the small data policy that is transferred by the MME, the UE uses a small data optimization transmission mechanism to perform transmission; otherwise, a DRB is established to perform service data transmission. When downlink data arrives at the SGW, if the service data conforms to the small data policy of the operator that is previously configured on the SGW, the SGW uses a small data optimization transmission mechanism; otherwise, a DRB is established to perform service data transmission.

The following separately describes processes of transmitting data on a dedicated bearer, a default bearer, or a bearer determined according to determination of a UE in both an uplink direction and a downlink direction, where the dedicated bearer and the default bearer are determined according to a small data transmission policy.

Figure 12:
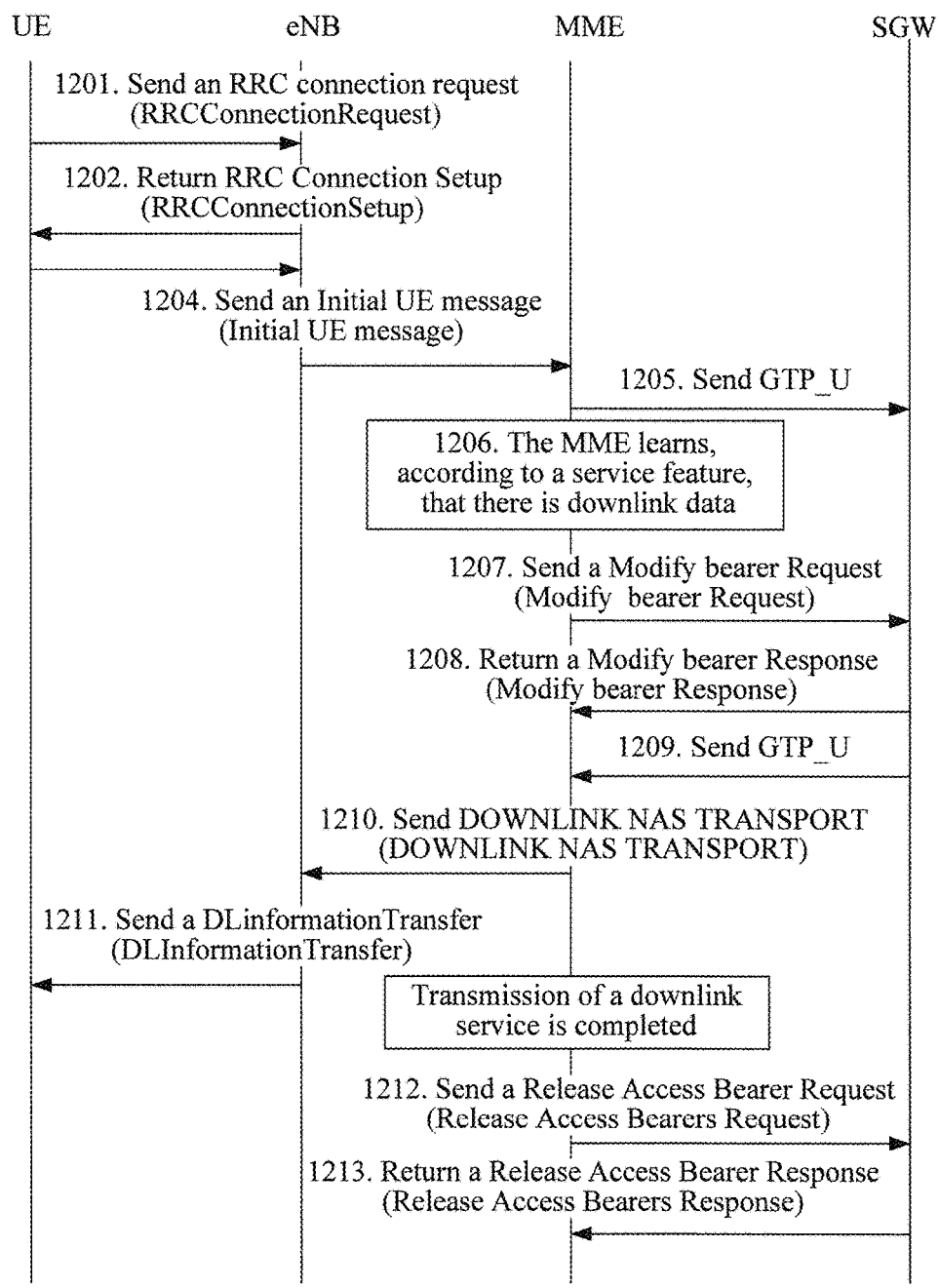
FIG. 12 is a schematic diagram of specific procedures of data transmission in an uplink direction and a downlink direction according to an embodiment of the present invention.

FIG. 12 shows procedures of transmitting data in an uplink direction and a downlink direction according to an embodiment of the present invention. This embodiment is an MO (mobile original, UE originated) scenario, in which an MME replaces an eNB to assign a user plane TEID and an address to an SGW and performs data transmission, and after the transmission is completed, the MME deletes the TEID and the address that are previously assigned to the SGW.

1201 to 1203: A UE is in an RRC_idle state; when uplink data needs to be transmitted, the UE initiates an RRC connection setup procedure; and the UE transmits a NAS message in RRCConnectionSetupComplete, where the message includes a small data container, and transmits IP data and a bearer id by carrying the IP data and the bearer id in the small data container.

1204: An eNB transfers the small data container to an MME by carrying the small data container in an Initial UE message.

1205: The MME extracts the IP data from the small data container and encapsulates the IP data into user plane GTP data, finds an address and a TEID of a corresponding SGW according to the bearer id, and transfers the GTP-U data to the corresponding SGW.

1206: The MME may learn, according to a service feature that is previously obtained, whether the MME has a downlink service.

1207: If the MME has a downlink service, the MME replaces the eNB to assign a downlink TEID and a downlink address, and sends a Modify bearer Request (the request includes the bearer id, a GTP-U TEID, and the address) to the SGW.

1208: The SGW returns a Modify Bearer Response message. When downlink data arrives, the data is encapsulated into GTP-U data and sent to the MME.

1209 to 1211: After the MME receives the downlink data, the MME extracts IP data, assembles the IP data into a data container (which includes the IP data and a bearer id), and transfers the data container to the UE by carrying the data container in Downlink NAS TRANSPORT and using a DLinformationTransfer of the eNB.

1212 and 1213: When the downlink service is completed, the MME sends a Release Access bearer Request (which includes the bearer id) to the SGW. The SGW deletes the TEID and the address that are assigned by the MME on the SGW, and returns a Release Access bearer Response to the MME.

Figure 13:
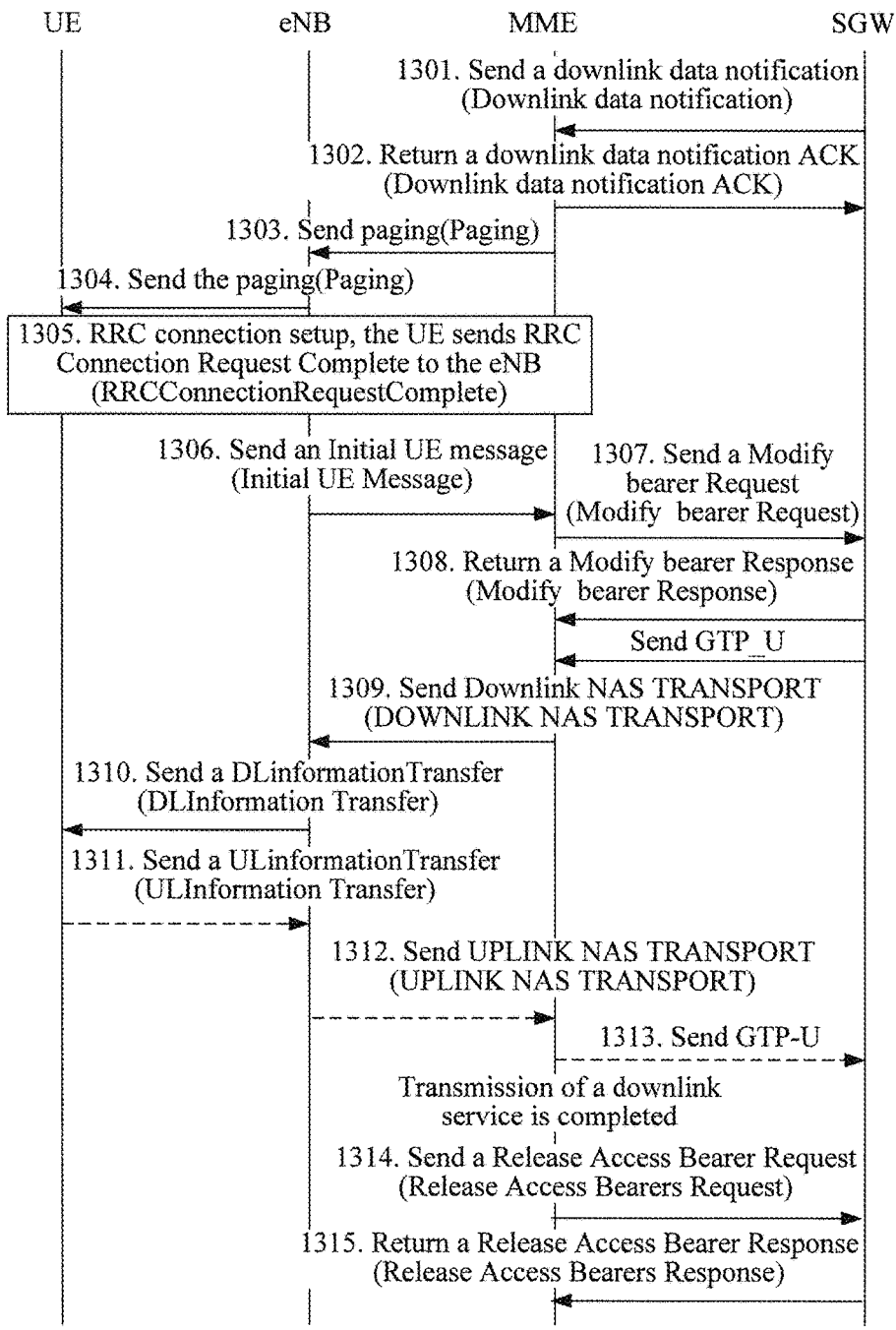
FIG. 13 is a schematic diagram of specific procedures of data transmission in an uplink direction and a downlink direction in an MT scenario according to an embodiment of the present invention.

FIG. 13 shows an example of uplink and downlink data transmission in an MT (Mobile Terminal, network side originated) scenario.

1301: An SGW receives downlink data; a UE is in an RRC_idle state; and the SGW sends a Downlink data notification to an MME, so as to trigger the MME to page a UE.

1302: The MME returns a Downlink data notification ACK to the SGW.

1303 and 1304: The MME pages the UE by using an eNB, and sends a paging message.

1305: After receiving the paging, the UE initiates an RRC connection setup process, and sends a NAS message Service Request by including the NAS message Service Request in RRCConnectionRequestComplete.

1306: The eNB transfers an Initial UE message to the MME, where the Initial UE message includes the NAS message Service Request.

1307: The NNE replaces the eNB to assign a downlink TEID and a downlink address, and sends a Modify bearer Request (which includes a bearer id, a GTP-U TEID, an address) to the SGW.

1308: The SGW returns a Modify Bearer Response message. When downlink data arrives, the data is encapsulated into GTP-U data and sent to the MME.

1309 and 1310: After the MME receives the downlink data that is sent by the SGW, the MME extracts IP data, carries the IP data in a NAS message data container (which includes the IP data and the bearer id), and transfers the data container to the eNB by carrying the data container in Downlink NAS TRANSPORT; and the eNB transfers the data container to the UE by carrying the data container in a DLinformationTransfer.

1311 to 1313: If the UE has uplink data to send, the UE encapsulates the data into a data container, and transfers the data container to the MME by using a ULinformationTransfer and Uplink NAS TRANSPORT; and the MME extracts IP data and transfers the IP data to the SGW by constructing the IP data into user plane GTP data.

1314 and 1315: When the downlink service is completed, the MME sends a Release Access bearer Request (which includes the bearer id) to the SGW. The SGW deletes the TEID and the address that are assigned by the MME on the SGW, and returns a Release Access bearer Response to the MME.

In all the foregoing embodiments, data is encapsulated by using a data container; and in an uplink direction, when small data transmitted by using a plurality of bearers is transmitted, the data container (or referred to as small data container) may include an IP packet list, which is shown in Table 1.

TABLE 1

IP packet list
\>IP packet list Item IEs
\>\>Bearer id
\>\>IP data

When receiving this list, the MME needs to find a TEID and an address of a corresponding SGW according to the bearer id, and transfers the IP data to the SGW by constructing the IP data into a GTP_U packet.

When downlink data needs to be transmitted and when the SGW receives IP data transmitted by using a plurality of bearers and determines that the IP data is small data, the SGW may also construct an IP packet list, which is shown in Table 2.

TABLE 2

IP packet list
\>IP packet list Item IEs
\>\>Bearer id
\>\>IP data

When the MME receives this list, the MME transfers the list to the UE by carrying the list in a NAS message small data container.

If receiving data transmitted by using a plurality of bearers, the SGW may also directly sends the data transmitted by using the plurality of bearers to the MME without constructing the foregoing list. When receiving a plurality of DDN (which includes IP data and a bearer id) messages, the MME may construct an IP packet list, as shown in Table 3.

TABLE 3

IP packet list
\>IP packet list Item IEs
\>\>Bearer id
\>\>IP data

The MME transfers the list to the UE by carrying the list in a NAS message small data container.

In conclusion, it may be understood that the embodiments of the present invention provide a process in which a network side notifies a UE of a small data transmission policy, so as to increase efficiency of small data transmission. Moreover, a UE, an SGW, or an MME may construct an IP packet list (bearer id, IP Packet), so that small data data transmitted by using a plurality of bearers can be transmitted once, thereby further increasing the transmission efficiency. In addition, when a small data transmission policy is determined, if the SGW does not support a small data feature, the MME may establish a bearer to the SGW for transmitting data before transmitting the data, so that transmission of small data does not rely on a feature of the SGW.

A person of ordinary skill in the art may understand that all or a part of the processes of the methods in the foregoing embodiments may be implemented by a computer program instructing relevant hardware. The program may be stored in a computer readable storage medium. When the program is run, the processes of the methods in the foregoing embodiments are performed. The storage medium may include: a magnetic disk, an optical disc, a read-only memory ROM), a random access memory (RAM), or the like.

The foregoing disclosed are only exemplary embodiments of the present invention, but are not intended to limit the protection scope of the present invention; therefore, equivalent variations made according to the claims of the present invention still falls within the scope of the present invention.

What is claimed is:

1. A mobility management entity, comprising:
a processor;
a transceiver coupled to the processor, wherein the transceiver is configured to:
  receive a small data transmission parameter from a user equipment via a first non-access stratum (NAS) message, wherein the small data transmission parameter comprises an indication that the user equipment supports small data transmission;
the processor is configured to:
  determine a small data transmission policy based on the indication, wherein the small data transmission policy indicates that small data transmission is supported; and
for uplink data transmission:
  the transceiver is further configured to:
    receive a data container that encapsulates uplink data and a bearer identity via a second NAS message and is sent from the user equipment, and
  the processor is further configured to:
    determine a tunnel endpoint identifier (TEID) of a network side device and an IP address of the network side device based on the bearer identity,
    construct a general packet radio system tunneling protocol-user plane (GTP-U) packet using the uplink data, and
    cause the transceiver to transmit the GTP-U packet to the network side device corresponding to the TEID of the network side device and the IP address of the network side device.

2. The mobility management entity according to claim 1, wherein:
the small data transmission parameter further comprises a service feature of small data; and
the service feature of the small data comprises one or more of the following: an amount of data that is transmitted each time, a data transmission direction, a data transmission duration, and a number of times of transmission within the data transmission duration.

3. The mobility management entity according to claim 1, wherein the processor is further configured to:
determine, according to the small data transmission parameter, a bearer type for performing the small data transmission, wherein the bearer type comprises at least one of a dedicated bearer or a default bearer.

4. The mobility management entity according to claim 3, wherein:
the bearer type is a bearer dedicated for the small data transmission; and
the processor is further configured to:
  determine, according to the small data transmission parameter, an indication of establishing the bearer dedicated for the small data transmission and a parameter of the bearer dedicated for the small data transmission.

5. The mobility management entity according to claim 3, wherein:
the bearer type is a default bearer; and
the processor is further configured to:
  determine, according to the small data transmission parameter, the default bearer for the small data transmission and a parameter of the default bearer.

6. The mobility management entity according to claim 1, wherein:
the transceiver is further configured to:
  send the small data transmission parameter to the network side device; and
  receive an indication of a small data bearer that is determined by the network side, wherein the indication of the small data bearer is used to indicate establishment of a dedicated bearer for the small data transmission or indicate adoption of a default bearer for the small data transmission.

7. The mobility management entity according to claim 1, wherein the transceiver is further configured to:
send, to the user equipment, a limit on the maximum number of times of transmission and/or a limit on the maximum number of bytes in transmission.

8. An apparatus for use in a mobility management entity, the apparatus comprising:
a processor;
a storage medium coupled to the processor, the storage medium comprising executable instructions that when executed by the processor, cause the mobility management entity to:
  receive, via a first non-access stratum (NAS) message, a small data transmission parameter from a user equipment, wherein the small data transmission parameter comprises an indication that the user equipment supports small data transmission,
  determine a small data transmission policy based on the indication, wherein the small data transmission policy indicates that small data transmission is supported, and
  for uplink data transmission:
    receive a data container that encapsulates uplink data and a bearer identity via a second NAS message and is sent from the user equipment,
    determine a tunnel endpoint identifier (TEID) of the network side device and an IP address of the network side device based on the bearer identity,
    construct a general packet radio system tunneling protocol-user plane (GTP-U) packet using the uplink data, and
    transmit the GTP-U packet to the network side device corresponding to the TEID of the network side device and the IP address of the network side device.

9. The apparatus according to claim 8, wherein:
the small data transmission parameter further comprises a service feature of small data; and
the service feature of the small data comprises one or more of the following: an amount of data that is transmitted each time, a data transmission direction, a data transmission duration, and a number of times of transmission within the data transmission duration.

10. The apparatus according to claim 8, wherein the executable instructions, when executed by the processor, cause the mobility management entity to:

determine, according to the small data transmission parameter, a bearer type for performing the small data transmission, wherein the bearer type comprises at least one of a dedicated bearer or a default bearer.

11. The apparatus according to claim 8, wherein the instructions, when executed by the processor, further cause the mobility management entity to:
send, to the user equipment, a limit on the maximum number of times of transmission and/or a limit on the maximum number of bytes in transmission.

12. A method performed by a mobility management entity, comprising:
receiving, through a first non-access stratum (NAS) message, a small data transmission parameter from a user equipment, wherein the small data transmission parameter comprises an indication that the user equipment supports small data transmission;
determining a small data transmission policy based on the indication, wherein the small data transmission policy indicates that small data transmission is supported; and
for uplink data transmission:
receiving a data container that encapsulates uplink data and a bearer identity via a second NAS message and is sent from the user equipment;
determining a tunnel endpoint identifier (TEID) of the network side device and an IP address of the network side device based on the bearer identity;
constructing a general packet radio system tunneling protocol-user plane (GTP-U) packet using the uplink data; and
transmitting the GTP-U packet to the network side device corresponding to the TEID and the IP address.

13. The method according to claim 12, wherein:
the small data transmission parameter further comprises a service feature of small data; and
the service feature of the small data comprises one or more of the following: the amount of data that is transmitted each time, a data transmission direction, a data transmission duration, and the number of times of transmission within the data transmission duration.

14. The method according to claim 12, further comprising:
determining, according to the small data transmission parameter, a bearer type for performing the small data transmission, wherein the bearer type comprises at least one of a dedicated bearer or a default bearer.

15. The method according to claim 12, further comprising:
sending, to the user equipment, a limit on the maximum number of times of transmission and/or a limit on the maximum number of bytes in transmission.

16. A non-transitory computer-readable storage medium comprising instructions that, when executed by a computer, cause the computer to:
receive, through a first non-access stratum (NAS) message, a small data transmission parameter from a user equipment, wherein the small data transmission parameter comprises an indication that the user equipment supports small data transmission;
determine a small data transmission policy based on the indication, wherein the small data transmission policy indicates that small data transmission is supported; and
for uplink data transmission:
receive a data container that encapsulates uplink data and a bearer identity via a second NAS message and is sent from the user equipment;
determine a tunnel endpoint identifier (TEID) of the network side device and an IP address of the network side device based on the bearer identity;
construct a general packet radio system tunneling protocol-user plane (GTP-U) packet using the uplink data; and
transmit the GTP-U packet to the network side device corresponding to the TEID and the IP address.

17. The non-transitory computer-readable storage medium according to claim 16, wherein:
the small data transmission parameter further comprises a service feature of small data; and
the service feature of the small data comprises one or more of the following: the amount of data that is transmitted each time, a data transmission direction, a data transmission duration, and the number of times of transmission within the data transmission duration.

18. The non-transitory computer-readable storage medium according to claim 16, further comprising instructions that, when executed by the computer, cause the computer to:
determine, according to the small data transmission parameter, a bearer type for performing the small data transmission, wherein the bearer type comprises at least one of a dedicated bearer or a default bearer.

19. The non-transitory computer-readable storage medium according to claim 16, further comprising instructions that, when executed by the computer, cause the computer to:
send, to the user equipment, a limit on the maximum number of times of transmission and/or a limit on the maximum number of bytes in transmission.

20. A communication system, comprising a mobility management entity and a serving gateway, wherein:
the mobility management entity is configured to:
receive, through a first non-access stratum (NAS) message, a small data transmission parameter from a user equipment, wherein the small data transmission parameter comprises an indication that the user equipment supports small data transmission;
determine a small data transmission policy based on the indication, wherein the small data transmission policy indicates small data transmission is supported; and
for uplink data transmission:
receive a data container that encapsulates uplink data and a bearer identity via a second NAS message and is sent from the user equipment;
determine a tunnel endpoint identifier (TEID) of the serving gateway and an IP address of the serving gateway based on the bearer identity;
construct a general packet radio system tunneling protocol-user plane (GTP-U) packet using the uplink data; and
transmit the GTP-U packet to the serving gateway corresponding to the TEID of the serving gateway and the IP address of the serving gateway;
the serving gateway is configured to:
for uplink data transmission:
receive the GTP-U packet.

21. The communication system according to claim 20, wherein
the mobility management entity is further configured to:
send, to the user equipment, a limit on the maximum number of times of transmission and/or a limit on the maximum number of bytes in transmission.

* * * * *